June 30, 1953 — G. E. DATH ET AL — 2,643,875
FRICTION SHOCK ABSORBER FOR TRUCKS OF RAILWAY CARS
Filed May 1, 1950
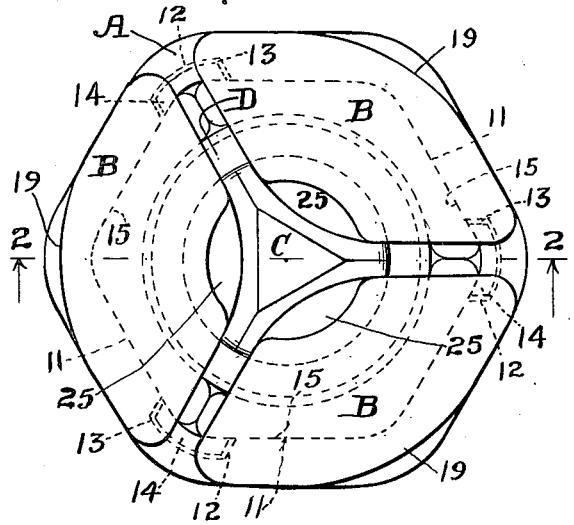
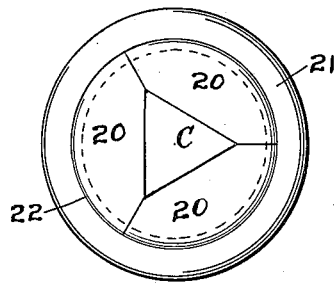
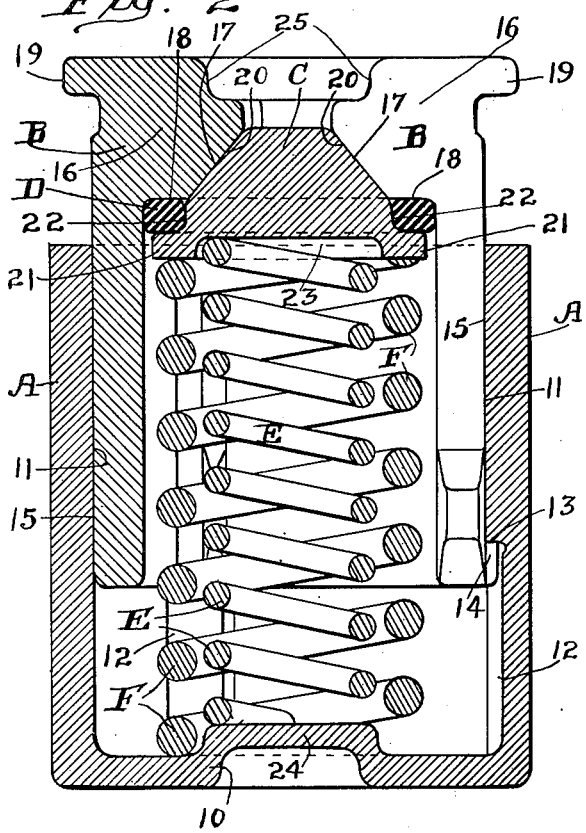
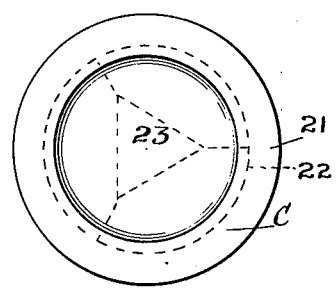
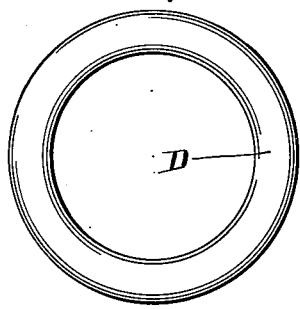
Inventors:
George E. Dath.
Edward H. Lehman.
By Henry Fuchs.
Atty.

Patented June 30, 1953

2,643,875

UNITED STATES PATENT OFFICE 2,643,875

FRICTION SHOCK ABSORBER FOR TRUCKS OF RAILWAY CARS

George E. Dath, Mokena, and Edward H. Lehman, Chicago, Ill., assignors to W. H. Miner, Inc., Chicago, Ill., a corporation of Delaware Application May 1, 1950, Serial No. 159,348

1 Claim. (Cl. 267—9)

This invention relates to improvements in friction shock absorbers for snubbing the action of railway car truck springs.

One object of the invention is to provide a friction shock absorbing device comprising a friction casing, friction shoes having sliding frictional engagement with the interior walls of the casing, a combined wedge and spring follower member having wedging engagement with the shoes, springs within the casing yieldingly opposing inward movement of the combined wedge and spring follower member, and rubber means reacting between the latter and the shoes for breaking the wedging contact between the same to facilitate release of the mechanism.

Other objects of the invention will more clearly appear from the description and claim hereinafter following.

In the accompanying drawing forming a part of this specification, Figure 1 is a top plan view of our improved shock absorber. Figure 2 is a transverse, vertical sectional view, corresponding substantially to the line 2—2 of Figure 1. Figure 3 is a top plan view of the combined wedge and spring follower member of our improved mechanism. Figure 4 is a bottom plan view of the combined wedge and spring follower member. Figure 5 is a top plan view of the rubber ring which forms the means for breaking the wedging contact between the combined wedge and spring follower member and the friction shoes.

Referring to the drawing, our improved friction shock absorber comprises broadly a friction casing A, three friction shoes B—B—B, a combined wedge and spring follower member C, a rubber ring D, and springs E and F.

The casing A is in the form of a hexagonal, tubular member, open at its top end and closed by a transverse wall 10 at its bottom end. The interior of the casing A presents three lengthwise extending friction surfaces 11 of V-shaped, transverse cross section. At alternate corners, the interior walls of the casing A are vertically slotted at their lower ends, as indicated at 12, the transverse wall at the upper end of each slot 12 providing a shoulder 13 with which a lug 14 on the corresponding shoe is engageable to restrict outward movement of said shoe.

The friction shoes B are three in number and are symmetrically arranged about the vertical central axis of the casing A in sliding engagement with the friction surfaces 11 of the latter, each shoe having a lengthwise extending friction surface 15 of V-shaped, transverse cross section, cooperating with the corresponding V-shaped friction surface 11 of the casing. At its upper end, each shoe has a laterally inwardly enlarged head portion 16, having a flat wedge face 17 on the underneath side. The underneath side of the head portion 16 also presents a horizontally disposed, downwardly facing, flat abutment face or shoulder 18 outwardly of the wedge face 17. The inner side of each shoe, below the head portion 16 thereof, is preferably transversely curved. Each shoe has a laterally outwardly projecting, horizontal flange 19 at its upper end, overhanging the upper end of the casing A and engageable therewith to limit compression of the mechanism.

The combined wedge and spring follower member C is in the form of a block having three upwardly converging wedge faces 20—20—20 at the upper end engaged with the wedge faces 17—17—17 of the three shoes. At its bottom end, the member C is provided with a laterally extending, annular, horizontal flange 21, which underlies the abutment faces or shoulders 18—18—18 of the three shoes. The base portion of the member C above the flange 21 and below the wedge faces 17—17—17 is cylindrical, as indicated at 22.

The rubber ring D is supported on the flange 21 of the member C and is confined between the curved inner sides of the shoes B—B—B and the cylindrical base portion 22 of the member C. The upper side of the ring D abuts the flat shoulders 18—18—18 of the shoes B—B—B. In the assembled condition of the mechanism, the ring D is under a predetermined amount of initial compression and tends to force the shoes B—B—B and the member C apart in vertical direction to break the contact between the cooperating wedge faces of the same.

The springs E and F are arranged within the casing A between the shoes B—B—B. Each of these springs is in the form of a helical coil, the spring F being heavier than the spring E and surrounding the latter. The inner spring E has its upper end bearing on the member C, being engaged in a central seat 23 provided in the underneath side of said member, and has its lower or bottom end bearing on an upstanding hollow boss 24 on the wall 10 of the casing A. The outer spring F has its top end bearing on the bottom side of the flange 21 of the member C, and its bottom end surrounding the boss 24 and bearing directly on the bottom wall 10 of the casing A.

The hollow boss 24 on the bottom wall 10 of the casing A provides a seat which is adapted to accommodate the usual spring centering projection on the bottom spring follower plate of a cluster of truck springs. The head portions 16—16—16 of the shoes are recessed on their inner sides, as indicated at 25—25—25, to provide a pocket for accommodating the usual spring centering projection of the top spring follower plate of the truck spring cluster.

Our improved shock absorber preferably replaces one or more of the spring units of a cluster of truck springs of a railway car, being interposed between the top and bottom spring plates of said cluster.

The operation of our improved shock absorber is as follows: Upon the spring cluster of the truck of a railway car being compressed between the spring follower plates of the cluster, the shoes B are forced downwardly with respect to the casing A, moving the shoes inwardly of the casing, against the spring resisted combined wedge and spring follower member C. Due to wedging engagement between the member C and the shoes B—B—B, the latter are spread apart into tight frictional engagement with the friction surfaces of the casing A. Frictional resistance is thus provided between the shoes B—B—B and the casing A, during sliding movement of the shoes, to snub the action of the truck springs. Upon recoil of the truck springs and upward movement of the top spring follower plate of the truck spring cluster, the springs E and F return all of the parts to the normal full release position shown in Figure 2. As the actuating pressure is removed from the shoes, during recoil of the truck springs, the wedging contact between the shoes B—B—B and the member C is broken by the compressed rubber ring D, which acts directly on the shoes B—B—B to force the same upwardly away from the member C, thereby assuring instantaneous release of the mechanism.

We claim:

In a friction shock absorber, the combination with a friction casing; of a plurality of friction shoes slidingly telescoped within the casing, each shoe having a downwardly facing abutment shoulder thereon; a combined wedge and spring follower member in wedging engagement with said shoes; an outwardly projecting, annular flange on said member; a rubber ring between said flange and the shoulders of the shoes, said ring bearing at its top and bottom sides on said shoulders and said flange, respectively, said ring being under initial compression; and spring means within the casing yieldingly opposing movement of said member inwardly of the casing.

GEORGE E. DATH.
EDWARD H. LEHMAN.

References Cited in the file of this patent

UNITED STATES PATENTS

| Number | Name | Date |
|---|---|---|
| 754,670 | Miner | Mar. 15, 1904 |
| 1,026,113 | O'Connor | May 14, 1912 |
| 1,076,749 | Courson | Oct. 28, 1913 |
| 1,255,238 | Sherman | Feb. 5, 1918 |
| 1,290,304 | O'Connor | Jan. 7, 1919 |
| 1,988,427 | Barrows | Jan. 15, 1935 |
| 2,383,656 | Kinne | Aug. 28, 1945 |
| 2,486,556 | Dath | Nov. 1, 1948 |